US006963460B2

United States Patent
Jain et al.

(10) Patent No.: US 6,963,460 B2
(45) Date of Patent: Nov. 8, 2005

(54) VOLTAGE REGULATOR OPERABLE OVER A WIDE RANGE OF SUPPLY VOLTAGE

(75) Inventors: Manish Jain, San Jose, CA (US); Roberto Alini, Dublin, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 273 days.

(21) Appl. No.: 10/295,263

(22) Filed: Nov. 14, 2002

(65) Prior Publication Data

US 2004/0095667 A1 May 20, 2004

(51) Int. Cl.$^7$ ................................................ G11B 5/09
(52) U.S. Cl. ........................ 360/46; 360/66; 330/127; 323/268

(58) Field of Search .............................. 360/46, 67, 66; 330/127; 327/530; 323/268, 269

(56) References Cited

U.S. PATENT DOCUMENTS 4,611,162 A * 9/1986 Erratico et al. ............. 323/269

* cited by examiner

Primary Examiner—Alan T. Faber
(74) Attorney, Agent, or Firm—Lisa K. Jorgenson; Bryan A. Santarelli

(57) ABSTRACT

A voltage regulator includes an output node and first and second regulator circuits. The first regulator circuit generates a first regulated voltage on the output node when a supply voltage equals or exceeds a predetermined threshold, and the second regulator circuit generates a second regulated voltage on the output node when the supply voltage is less than the predetermined threshold.

27 Claims, 3 Drawing Sheets

US 6,963,460 B2

VOLTAGE REGULATOR OPERABLE OVER A WIDE RANGE OF SUPPLY VOLTAGE

TECHNICAL FIELD

The present invention relates generally to electronic circuits, and more particularly, to a system and method for regulating a voltage.

BACKGROUND OF THE INVENTION

Most of today's advanced semiconductor processes yield complimentary metal-oxide semiconductor (CMOS) having breakdown voltages of no more than approximately 4.0 volts (V). Therefore, if the voltage supplied to such CMOS chips is greater than 4.0 V (e.g. 5.0 V) it is regulated down to an acceptable lower voltage such as 3.3 V. Because many disk-drive systems include a 5.0 V power supply, CMOS chips, such as a disk-drive controller that are used in disk-drive systems often include an on-board voltage regulator.

In a typical disk-drive system, it is common for the 5.0 V supply to temporarily dip below 5.0 V due to power fluctuations and voltage spikes. For example, power fluctuations can be caused by sudden starts and stops of the voice-coil motor (VCM) which moves the read head. If the supply voltage falls below 5.0 V for a specified length of time, then a typical disk-drive controller circuit enters a power-down mode so that the circuits drawing power from the regulator will significantly decrease their current requirements. But if the supply voltage becomes too low, the regulator may be unable to provide a regulated voltage to the power-down circuitry of the disk-drive controller. Unfortunately, this lack of a regulated voltage may cause the power-down circuitry to malfunction. Furthermore, the disk-drive controller may incorrectly interpret temporary dips in the supply voltage as an indication of a power-down condition.

SUMMARY OF THE INVENTION

In one aspect of the invention, a voltage regulator includes an output node and first and second regulator circuits. The first regulator circuit generates a first regulated voltage on the output node when a supply voltage equals or exceeds a predetermined threshold, and the second regulator circuit generates a second regulated voltage on the output node when the supply voltage is less than the predetermined threshold.

Such a voltage regulator can provide a regulated voltage even when the supply voltage is in a low-supply condition during a temporary dip in the supply voltage, or during a power-down mode brought on by a low-supply condition. Specifically, the first regulator circuit can generate the first regulated voltage during normal conditions, and the second regulator circuit can generate the second regulated voltage during a low-supply condition, where the second regulated voltage is less than or equal to the first regulated voltage. In one example, when the supply voltage is greater than 4.3 V (normal range), then the first regulator circuit generates the first regulated voltage equal to 3.3 V while the second regulator is inactive. But when the supply voltage is 4.0 V or less (low-supply condition), the second regulator activates to generate the second regulated voltage equal to 3.0 V. Consequently, the second regulator maintains a regulated voltage for power-down circuits during a low-supply condition.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE PREFERRED EMBODIMENT

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
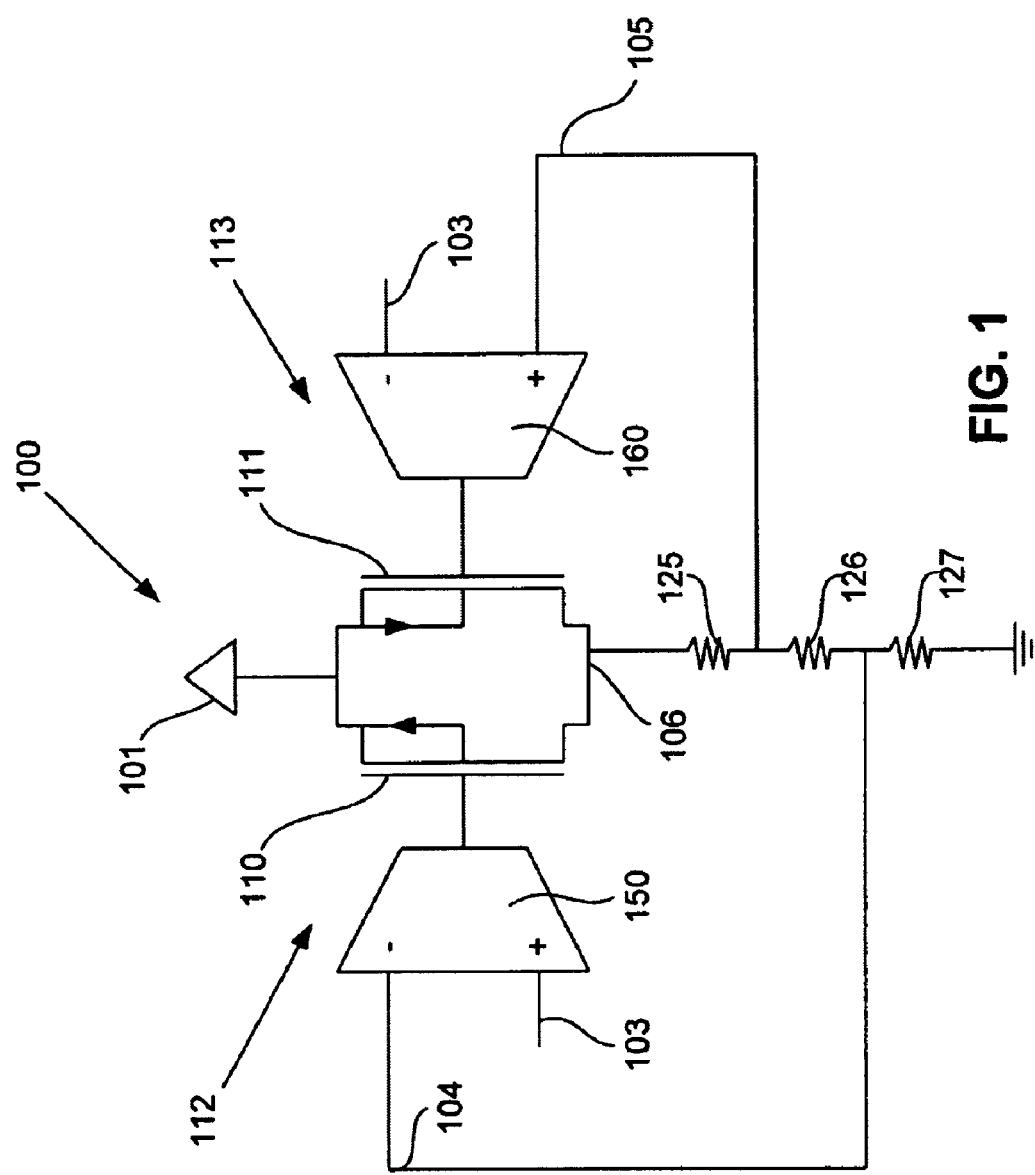
FIG. 1 is a block diagram of a voltage regulator according to an embodiment of the invention.

FIG. 1 shows a block diagram of a voltage regulator 100 that includes a first and a second regulation circuit 112 and 113 according to an embodiment of the invention. The second circuit 113 activates when Vcc 101 (5.0 V nominal in one embodiment) becomes too low for the first circuit 112 to regulate.

In one embodiment, the voltage regulator 100 provides a regulated voltage 106, Vreg, for circuits constructed with 3.6-volt CMOS technology. Therefore, the voltage regulator 100 generates Vreg=3.3 V from Vcc=5.0 V More specifically, a differential amplifier, GM1 150, is driven by a voltage difference between a reference voltage 103 (for example, a bandgap reference of 1.2 V), and a first feedback voltage 104 Vf1 that is derived from a resistor-bridge feedback network that includes three resistors 125, 126, and 127. GM1 150 controls an NMOS transistor 110 to generate Vreg=3.3 V. The first circuit 112 is typically designed for a capacitive load of up to approximately 160 picofarads and a load current between 0 and 50 milliamps.

Because the gate-to-source threshold of the NMOS transistor 110, an enhancement transistor in this embodiment, is approximately 1.0 V, as long as Vcc 101 stays at 4.3 V or higher, GM1 150 can drive the NMOS transistor 110 to regulate Vreg=3.3 V. But if Vcc 101 falls below a first threshold voltage of approximately 4.3 V in this embodiment, GM1 150 does not have enough "headroom" to drive the NMOS transistor 110. Consequently, the NMOS transistor 110 effectively becomes a forward-biased diode such that Vreg=Vcc−Vt wherein Vt is the threshold voltage of the NMOS transistor 110.

To compensate, however, when Vcc 101 falls below a second threshold voltage of approximately 4.0 V in this embodiment, the second circuit 113 is activated to generate Vreg 106 at a second level of 3.0 V in this embodiment. Specifically, a difference between Vref 103 and a second feedback voltage 105, Vf2, that is also derived from the resistors 125, 126, and 127. drives the amplifier GM2 160. GM2 160 drives the PMOS transistor 111 which generates Vreg=3.0 V. This provides a regulated voltage for power-down circuitry (not shown), which activates when Vcc 101 falls below a threshold voltage such as 4.3 V.

Figure 2:
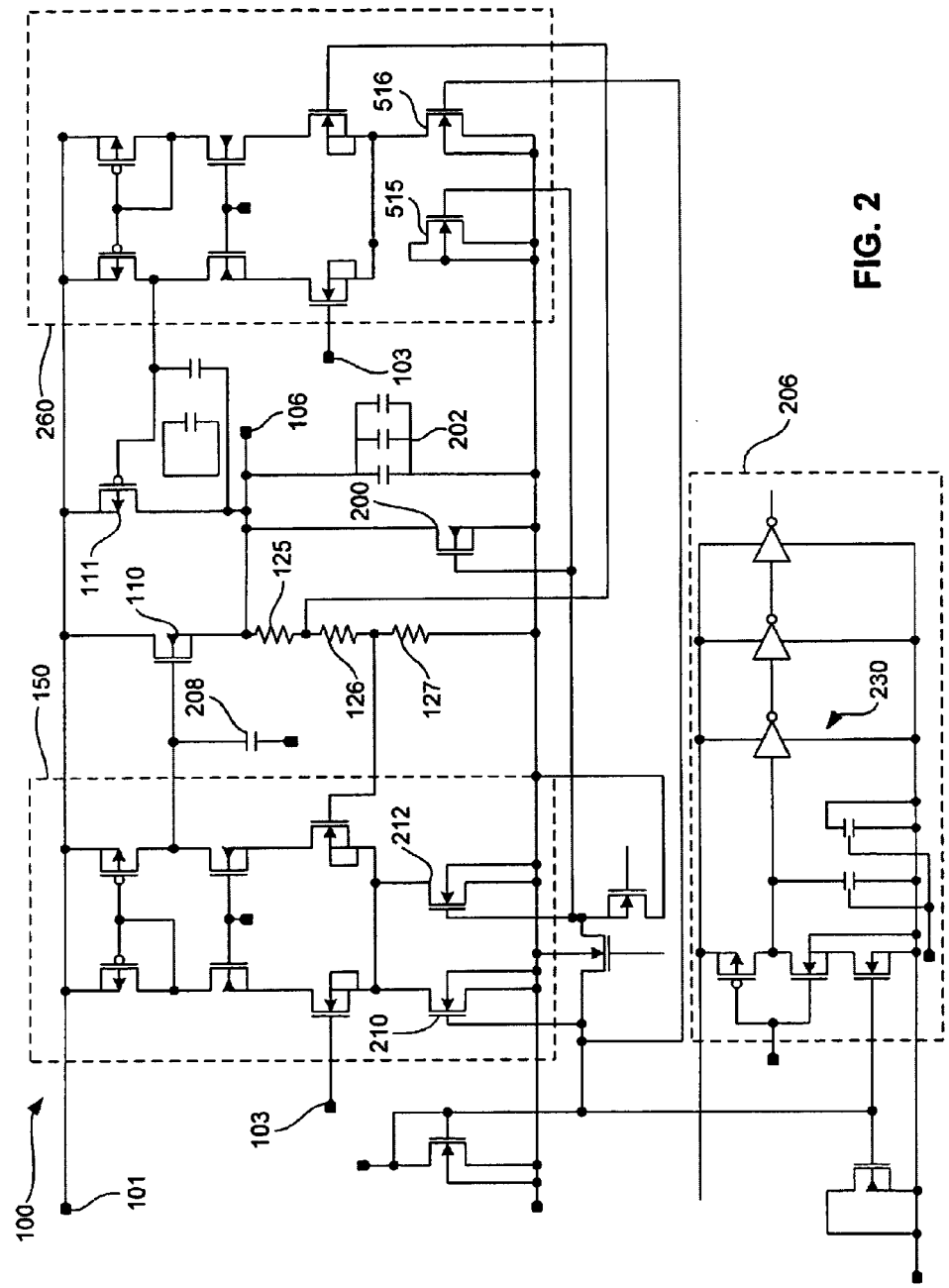
FIG. 2 is a schematic diagram of the voltage regulator of FIG. 1 according to an embodiment of the invention.

FIG. 2 is a schematic diagram of the voltage regulator 100 of FIG. 1 according to an embodiment of the invention. In addition to the first and second regulation circuits 112 and 113 and the feedback resistors 125, 126, and 127, the regulator 100 includes a quiescent current source 200, stabilization capacitors 202, a conventional bias-voltage generator 204, and a power-down circuit 206.

In addition to the GM1 amplifier 150 and the NMOS output transistor 110, the first regulation circuit 112 includes a capacitor 208, which stabilizes the circuit 112 in a conventional manner. Because the MOS transistors of the circuit 112 are built with 3.6 V CMOS technology, the GM1 amplifier 150 is cascoded to insure that the voltage across any one of its transistors does not exceed the breakdown voltage of 3.6 V. The GM1 amplifier 150 also includes a main current source 210 and an optional power-down current source 212, which deactivates in a power-down mode to reduce the power consumed by the circuit 112 as discussed below.

In addition to the GM2 amplifier 160 and the PMOS output transistor 111, the second regulation circuit 113 includes a capacitor 214, which stabilizes the circuit 113 in a conventional manner. Like the GM1 amplifier 150, the GM2 amplifier 160 is cascoded to insure that the voltage across any one of its transistors does not exceed the breakdown voltage of 3.6 V, and includes a main current source 216 and an optional power-down current source 218.

Because the first regulator circuit 112 is designed to provide a load current of 0–50 milliamps (mA) at the Vreg node 106, the current source 200, which is an NMOS transistor here, draws a quiescent current of 1 mA so that the NMOS transistor 110 operates in the saturation region even when the load current is low. Alternatively, the current source 200 can be eliminated, and the values of the resistors 125, 126, and 127 adjusted to provide the desired quiescent current.

The capacitors 202 stabilize the voltage regulator 100 in a conventional manner, and the bias-voltage generator generates a bias voltage for the current sources 210, 212, 200, 216, and 218 and for the power-down circuit 206 in a conventional manner.

The power-down circuit 206 causes the first and second regulation circuits 112 and 113 and the current source 200 to operate with reduced power consumption during a power-down mode. The power-down circuit 206 receives a power-down signal PWD from an external source such as a disk-drive controller (FIG. 3), and generates complimentary power-control signals PWDBINT and PWDINT. When PWD is inactive low, PWDBINT and PWDINT are inactive high and low, respectively, such that the regulator circuits 112 and 113 operate in a normal mode. But when PWD is active high, PWDBINT and PWDING are active low and high, respectively, such that the current sources 200, 212, and 218 are inactive and the regulator circuits 112 and 113 operate in a low-power mode. Specifically, the remaining current sources 210 and 216 sink enough current to keep the amplifiers 150 and 160 at a minimum active level. While operating at this minimum level, the amplifiers 150 and 160 consume less power, and, therefore, the regulation circuits 112 and 113 provide less regulation than in normal mode. But this lower level of regulation is typically not a problem because the circuits (not shown) that the voltage regulator 100 powers typically consume less power during the power-down mode.

Still referring to FIG. 2, the operation of the voltage regulator 100 is discussed according to an embodiment of the invention. During normal operation when Vcc≧4.3V, PWDBINT and PWDINT are inactive high and low, respectively, such that all of the current sources 200, 210, 212, 216, and 218 are active. The GM1 amplifier 150 controls the gate voltage of the NMOS transistor 110 such that Vf1=Vref=1.2V, and Vreg=3.3 V—the values of the resistors 125, 126, and 127 are such that when Vf1=Vref, Vreg=3.3 V. Furthermore, as discussed above, the current source 200 draws a quiescent current of 1 mA to maintain the transistor 110 in the saturation region even under low-load conditions. Because Vreg 106 is derived from the source of the NMOS transistor 110, which operates in its saturation region, the voltage regulator 100 has low output impedance as is desired for a voltage regulator. Moreover, because Vf2>Vf1, the GM2 amplifier 160 inactivates the PMOS transistor 111 such that the second regulator circuit 113 has no affect on Vreg 106.

During intermediate operation when 4.3 V>Vcc>4.0 V, PWDBINT and PWDINT are inactive high and low, respectively, such that all of the current sources 200, 210, 212, 216, and 218 are active. But because the threshold voltage of the transistor 112 is approximately 1 V, the GM2 amplifier 150 has no headroom to control the transistor 110. That is, Vcc−Vreg<Vt=1 V. Consequently, the transistor 110 acts as a forward-biased diode that generates 3.3>Vreg= Vcc−Vt>3.0 V. Therefore, during intermediate operation, the voltage regulator 100 does not regulate Vreg 106. Fortunately, however, intermediate operation is typically caused by a momentary glitch in Vcc 101, and keeping Vreg>3 V allows the circuits (not shown) powered by Vreg 106 to continue operating during the glitch. Once Vcc 101 rises to 4.3 V or higher, the voltage regulator 100 operates in the normal mode as discussed above.

During low-power operation when Vcc≦4.0V for less than approximately 100 nanoseconds (ns), PWDBINT and PWDINT are inactive high and low, respectively, such that all of the current sources 200, 210, 212, 216, and 218 are active. The GM2 amplifier 160 controls the gate voltage of the PMOS transistor 111 such that Vf2=Vref=1.2V, and Vreg=3.0 V—the values of the resistors 125, 126, and 127 are such that when Vf2=Vref, Vreg=3.0 V. Fortunately, however, low-power operation is typically caused by a momentary glitch in Vcc 101, and keeping Vreg=3 V allows the circuits (not shown) powered by Vreg 106 to continue operating. Because Vcc−3.0 V<Vt, the NMOS transistor 110 is off such that the first regulator circuit 112 has no affect on Vreg 106. Furthermore, because Vreg 106 is derived from the drain of the PMOS transistor 111, the voltage regulator 100 has high output impedance, which is typically not desired for a voltage regulator. But including the PMOS transistor 111 instead of an NMOS transistor allows the regulation circuit 113 to generate Vreg=3.0 V for Vcc as low as ~3.4 V. Consequently, because of this high output impedance, the regulation circuit 112 is sometimes called a clamp circuit. Moreover, because low-power operation is typically caused by a momentary glitch in Vcc 101, keeping Vreg=3 V with a PMOS transistor allows the circuits (not shown) powered by Vreg 106 to continue operating during the glitch.

The 0.3 V buffer (4.3 V>Vcc>4.0 V) between normal operation of the regulation circuit 112 and the operation of the regulation circuit 113 prevents both regulation circuits from operating simultaneously in a feedback mode, and thus prevent potential instabilities such as oscillations that could result with such simultaneous operation.

Still referring to FIG. 2, a circuit such as a disk-drive controller (FIG. 3) initiates a power-down mode when Vcc≦4.0V for more than approximately 100 nanoseconds (ns). Specifically, the circuit generates PWD active high, such that in response, the power-down circuit 206 generates PWDBINT and PWDINT active low and high, respectively, such that the current sources 200, 212, and 218 are inactive, and the current sources 210 and 216 are active. To prevent momentary glitches in Vcc 101 from causing the voltage regulator 100 to enter the power-down mode, the power-down circuit 206 delays the generation of PWDBINT and PWDINT approximately 100 ns with a delay stage 230. Consequently, if PWD returns to inactive low within the delay period, the power-down circuit 206 does not generate PWDBINT and PWDINT at active levels. Of course the voltage regulator 100 operates in the intermediate or low-power mode if the power-down command is initiated by a glitch in VCC 101.

During the power-down mode, the voltage regulator 100 operates as discussed above for the low-power mode. Even though the high-output-impedance PMOS transistor 111 may provide Vreg=3.0 V for an extended period, the circuits (not shown) powered by Vreg 106 typically consume less power, and thus draw less current, during the power-down mode. Therefore, the regulation circuit 113 typically maintains Vreg=3.0 V for the expected load during power down.

Alternative embodiments of the voltage regulator 100 are contemplated. For example, either or both of the current sources 212 and 218 can be omitted or activated during low-power and power-down operation such that one or both of the regulation circuits 112 and 113 consume the same amount of power all the time. Furthermore, the values of the resistors 125, 126, and 127 can be adjusted to provide a desired quiescent current such that the current source 200 can be omitted. In addition, the value of the buffer between normal operation of the circuit 112 and operation of the circuit 113 can be zero or some value other than 0.3 V. If the buffer equals 0 V, then modifications to the voltage regulator 100 may be needed to prevent instabilities. Moreover, the amplifiers 150 and 160 may not be cascoded, particularly if the transistors in these amplifiers have breakdown voltages higher than 3.6 V. Furthermore, the power-down circuit 206 may eliminate the delay circuit 230, or the value of the delay may be changed.

Figure 3:
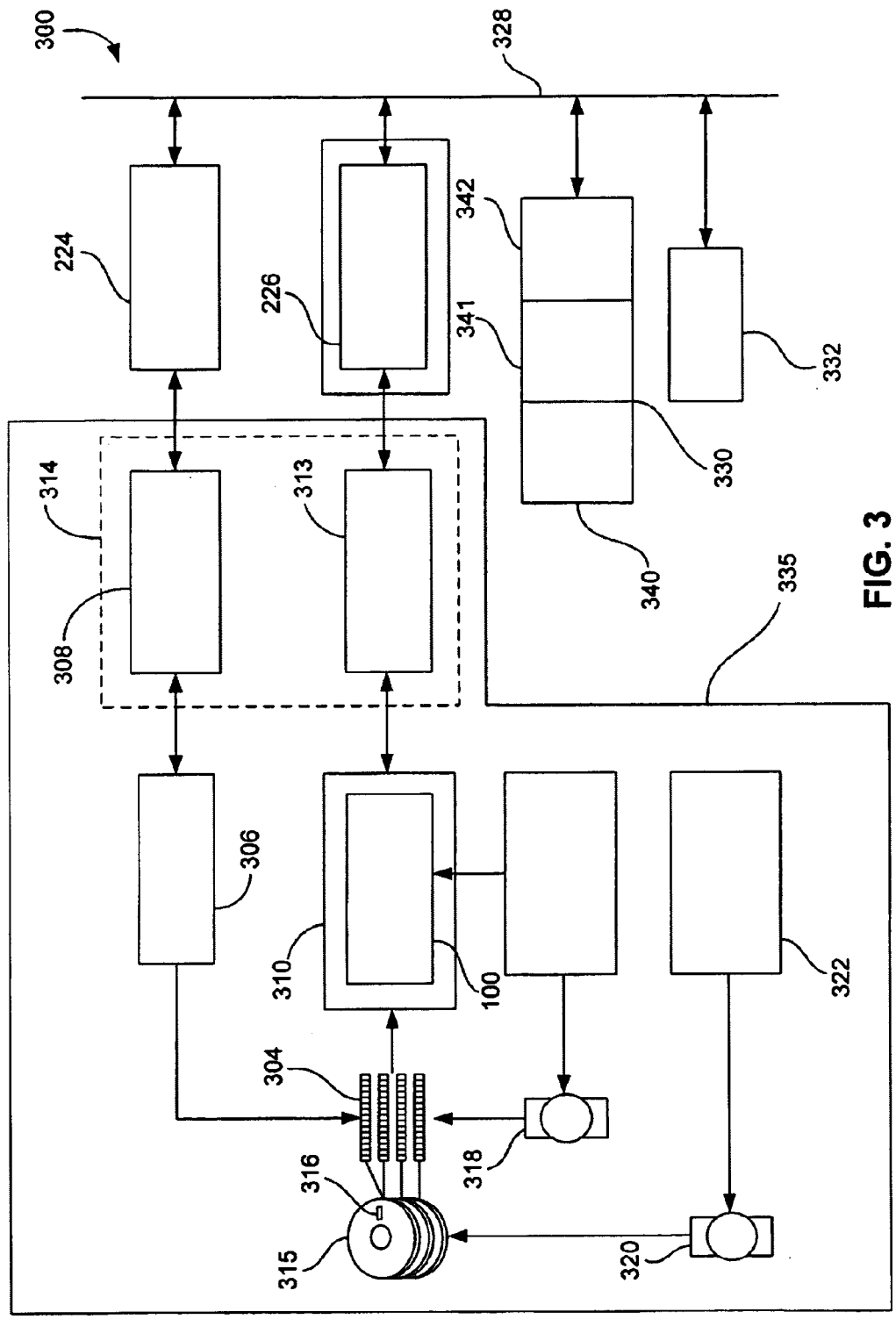
FIG. 3 is a block diagram of a disk-drive system that incorporates an embodiment of the invention.

With reference to FIG. 3, an exemplary computer system for implementing various embodiments of the invention includes a general purpose computer system 300 (e.g., personal or server), which includes one or more processing units 332, system memory 330, and a system bus 328. The system bus 328 couples the various system components including the system memory 330 to the processing unit 332. The system bus 328 may be any of several types of busses including a memory bus or a memory controller, a peripheral bus, and a local bus using any of a variety of bus architectures. The system memory 330 typically includes read-only memory (ROM) 340 and random-access memory (RAM) 341. Firmware 342 containing the basic routines that help to transfer information between elements within the computer system 300 is also contained within the system memory 330. The computer system 300 further includes a disk-drive system 335 for reading from and writing to a hard disk 315 that is also connected to the system bus 328 through a disk-drive controller 314. Additionally, optical drives (not shown), CD-ROM drives (not shown), floppy drives (not shown) may be connected to the system bus 328 through respective drive controllers (not shown) as well.

The disk-drive system 335 incorporates the voltage regulator 100 of FIGS. 1 and 2 according to an embodiment of the invention. In FIG. 3, The disk-drive system 335 includes a read-write head 304, a write channel 306 for generating and driving the read-write head 304 with a write signal, and a write controller 308 for interfacing the write data to the write channel 306. The disk drive system 335 also includes a read channel 310, which incorporates the voltage regulator 100. In one embodiment, the voltage regulator 100 provides a regulated supply voltage to a read-channel preamplifier (not shown), which may be disposed on a movable support arm 316 near the read-write head 304. Locating the preamplifier near the read-write head 304 often increases the signal-to-noise (S/N) ratio of the read signal. The read channel 310 also receives an application-data read signal and recovers application data therefrom. The disk drive system 335 also includes a read controller 313 for organizing the read data. Together, the write and read controllers 308 and 313 compose a disk-drive controller 314. The disk drive system 335 further includes a storage medium such as one or more disks 315, each of which may contain data on one or both sides and which may be a magnetic, optical, or another type of storage disk. The head 304 writes/reads the data stored on the disks 315, and is connected to the support arm 316. The head-position circuit 312 provides a control signal to a voice-coil motor (VCM) 318, which positionally maintains/radially moves the arm 318 so as to positionally maintain/radially move the head 304 over the desired data tracks on the disks 316. A spindle motor (SPM) 320 and a SPM control circuit 322 respectively rotates the disks 315 and maintains them at the proper rotational speed.

The disk-drive system 335 also includes write and read interface adapters 324 and 326 for respectively interfacing the disk-drive controller 314 to a system bus 328, which is specific to the system used. The above-described computer system 300 provides a suitable environment for implementing various embodiments of the voltage regulator 100.

We claim:

1. A voltage regulator, comprising:
   an output node;
   a first regulator circuit operable to generate a first regulated voltage on the output node when a supply voltage equals or exceeds a predetermined threshold; and
   a second regulator circuit operable to generate a second regulated voltage on the output node when the supply voltage is less than the predetermined threshold;
   wherein the first regulator circuit presents a first operational impedance at the output node; and
   the second regulator circuit presents a second operational impedance at the output node, the second operational impedance being significantly different than the first operational impedance.

2. The voltage regulator of claim 1 wherein the second regulated voltage is substantially equal to the first regulated voltage.

3. The voltage regulator of claim 1 wherein the second regulated voltage is less than the first regulated voltage.

4. A voltage regulator, comprising:
   an output node;
   a first regulator circuit operable to generate a first regulated voltage on the output node when a supply voltage equals or exceeds a predetermined threshold; and
   a second regulator circuit operable to generate a second regulated voltage on the output node when the supply voltage is less than the predetermined threshold,
   wherein:
   the supply voltage substantially equals 5 volts;
   the first regulated voltage substantially equals 3.3 volts;
   the predetermined threshold substantially equals 4.3 volts; and
   the second regulator circuit is operable to generate the second regulated voltage substantially equal to 3.0 volts when the supply voltage is less than or substantially equal to 4.0 volts.

5. A voltage regulator, comprising:

an output node;

a first regulator circuit operable to generate a first regulated voltage on the output node when a supply voltage equals or exceeds a predetermined threshold; and a second regulator circuit operable to generate a second regulated voltage on the output node when the supply voltage is less than the predetermined threshold, wherein:

the first regulator circuit presents a first operational impedance at the output node; and the second regulator circuit presents a second operational impedance at the output node, the second operational impedance being significantly higher than the first operational impedance.

6. A voltage regulator, comprising:

an output node;

a first regulator circuit operable to generate a first regulated voltage on the output node when a supply voltage equals or exceeds a predetermined threshold;

a second regulator circuit operable to generate a second regulated voltage on the output node when the supply voltage is less than the predetermined threshold; and a power down circuit operable to reduce the power consumed by the first regulator circuit during a power down mode.

7. A voltage regulator, comprising:

an output node;

a first regulator circuit operable to generate a first regulated voltage on the output node when a supply voltage equals or exceeds a predetermined threshold;

a second regulator circuit operable to generate a second regulated voltage on the output node when the supply voltage is less than the predetermined threshold; and a power down circuit operable to reduce the power consumed by the first and second regulator circuits during a power down mode.

8. A voltage regulator, comprising:

an output node;

a first regulator circuit operable to generate a first regulated voltage on the output node when a supply voltage equals or exceeds a predetermined threshold;

a second regulator circuit operable to generate a second regulated voltage on the output node when the supply voltage is less than the predetermined threshold; and a power down circuit operable to reduce the power consumed by the first regulator circuit a predetermined time after receiving a power down signal.

9. A voltage regulator, comprising:

an output node;

a first regulator circuit operable to generate a first regulated voltage on the output node when a supply voltage equals or exceeds a first predetermined threshold, and to generate an unregulated voltage on the output node when the supply voltage is between the first predetermined threshold and a second predetermined threshold that is less than the first predetermined threshold; and a second regulator circuit operable to generate a second regulated voltage on the output node when the supply voltage is less than or equal to the second predetermined threshold.

10. The voltage regulator of claim 9, wherein:

the first regulator circuit is operable to generate the first regulated voltage substantially equal to 3.3 volts when the supply voltage equals or exceeds 4.3 volts, and to generate the unregulated voltage substantially one gate source junction drop below the supply voltage when the supply voltage is between 4.0 volts and 4.3 volts; and the second regulator circuit is operable to generate the second regulated voltage substantially equal to 3.0 volts when the supply voltage is less than or equal to 4.0 volts.

11. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output transistor having a first control node coupled to the first amplifier output node and having a low-impedance output node coupled to the shared output node; and a second regulator circuit, comprising, a second differential amplifier having a second reference input node, a second feedback input node coupled to the second sense node, and a second amplifier output node, and a second output transistor having a second control node coupled to the second amplifier output node and having a high-impedance output node coupled to the shared output node.

12. A voltage regulator, comprising:

a shared output node;

first and second sense nodes coupled to the shared output node;

a first regulator circuit comprising, a first differential amplifier having a first reference input node, a first feedback input node coupled to the first sense node, and a first amplifier output node, and a first output stage having a first input node coupled to the first amplifier output node and having a first output node coupled to the shared node; and a second regulator circuit, comprising, a second differential amplifier having a second reference input node, a second feedback input node coupled to the second sense node, and a second amplifier output node, a second output stage having a second input node coupled to the second amplifier output node and having a second output node coupled to the shared output node;

a supply node;

a first impedance element coupled between the shared output node and the second sense node;

a second impedance element coupled between the first and second sense nodes; and a third impedance element coupled between the first sense node and the supply node.

13. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output stage having a first input node coupled to the first amplifier output node and having a first output node coupled to the shared node; and a second regulator circuit, comprising, a second differential amplifier having a second reference input node, a second feedback input node coupled to the second sense node, and a second amplifier output node, and a second output stage having a second input node coupled to the second amplifier output node and having a second output node coupled to the shared output node, wherein the first and second differential amplifiers comprise respective first and second cascoded differential amplifiers.

14. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output stage having a first input node coupled to the first amplifier output node and having a first output node coupled to the shared node; and a second regulator circuit, comprising, a second differential amplifier having a second reference input node, a second feedback input node coupled to the second sense node, and a second amplifier output node, and a second output stage having a second input node coupled to the second amplifier output node and having a second output node coupled to the shared output node, wherein:

the first output stage comprises an NMOS transistor having a control node coupled to the first amplifier output node and a drive node coupled to the shared output node; and the second output stage comprises a PMOS transistor having a control node coupled to the second amplifier output node and a drive node coupled to the shared output node.

15. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output stage having a first input node coupled to the first amplifier output node and having a first output node coupled to the shared node;

a second regulator circuit, comprising, a second differential amplifier having a second reference input node, a second feedback input node coupled to the second sense node, and a second amplifier output node, and a second output stage having a second input node coupled to the second amplifier output node and having a second output node coupled to the shared output node;

a power down circuit having a power down node; and wherein the first differential amplifier comprises a current source having a control terminal coupled to the power down node.

16. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output stage having a first input node coupled to the first amplifier output node and having a first output node coupled to the shared node;

a second regulator circuit, comprising, a second differential amplifier having a second reference input node, a second feedback input node coupled to the second sense node, and a second amplifier output node, and a second output stage having a second input node coupled to the second amplifier output node and having a second output node coupled to the shared output node; and a power down circuit having a power down node;

wherein the first differential amplifier comprises a first current source having a control terminal coupled to the power down node; and wherein the second differential amplifier comprises a second current source having a control terminal coupled to the power down node.

17. A voltage regulator, comprising:

a shared output node;

first and second sense nodes coupled to the shared output node;

a first regulator circuit, comprising, a first differential amplifier having a first reference input node, a first feedback input node coupled to the first sense node, and a first amplifier output node, and a first output stage having a first input node coupled to the first amplifier output node and having a first output node coupled to the shared node;

a second regulator circuit, comprising, a second differential amplifier having a second reference input node, a second feedback input node coupled to the second sense node, and a second amplifier output node, and a second output stage having a second input node coupled to the second amplifier output node and having a second output node coupled to the shared output node;

a supply node; and a current source coupled between the shared output node and the supply node.

18. The voltage regulator of claim 11 wherein the first reference input node of the first differential amplifier is coupled to the second reference input node of the second differential amplifier.

19. An integrated circuit, comprising:

a voltage regulator, including, an output node, a first regulator circuit operable to generate a first regulated voltage on the output node when the supply voltage equals or exceeds a predetermined threshold, and a second regulator circuit operable to generate a second regulated voltage on the output node when the supply voltage is less than the predetermined threshold;

wherein the first regulator circuit presents a first operational impedance at the output node; and the second regulator circuit presents a second operational impedance at the output node, the second operational impedance being significantly different than the first operational impedance.

20. A disk-drive system, comprising:

a first supply node operable to receive a supply voltage;

a data-storage disk having a surface and operable to store data;

a motor coupled to and operable to rotate the disk;

a read head operable to generate a signal that represents data;

a read-head positioning assembly operable to move the read head over the surface of the disk; and an amplifier coupled to the first supply node and operable to amplify the signal from the read head, the amplifier comprising, a second supply node, circuitry coupled to the second supply node, a first regulator circuit operable to generate a first regulated voltage on the second supply node when the supply voltage equals or exceeds a predetermined threshold, and a second regulator circuit operable to generate a second regulated voltage on the second supply node when the supply voltage is less than the predetermined threshold.

21. The disk-drive system of claim 20 wherein:

the read head positioning assembly comprises an actuator arm; and the read head and the amplifier are attached to the actuator arm.

22. A computer system, comprising:

a first supply node operable to receive a supply voltage;

a central processing unit coupled to a bus; and a disk-drive system coupled to the bus and to the supply node and comprising, a data-storage disk having a surface and operable to store data, a motor coupled to and operable to rotate the disk, a read head operable to generate a signal that represents data, a read-head positioning assembly operable to move the read head over the surface of the disk, and an amplifier coupled to the first supply node and operable to amplify the signal from the read head, the amplifier comprising, a second supply node, circuitry coupled to the second supply node, a first regulator circuit operable to generate a first regulated voltage on the second supply node when the supply voltage equals or exceeds a predetermined threshold, and a second regulator circuit operable to generate a second regulated voltage on the second supply node when the supply voltage is less than the predetermined threshold.

23. A method, comprising:

regulating a supply voltage to a first regulated voltage with a low-impedance driver when the supply voltage is greater than or equal to a first predetermined threshold voltage; and regulating the supply voltage to a second regulated voltage with a high-impedance driver when the supply voltage is less than the first predetermined threshold voltage.

24. The method of claim 23 wherein regulating the supply voltage to the second regulated voltage comprises regulating the supply voltage to the second regulated voltage when the supply voltage is less than or equal to a second predetermined threshold voltage that is less than the first predetermined threshold voltage.

25. A method, comprising:

regulating a supply voltage to a first regulated voltage when the supply voltage is greater than or equal to a first predetermined threshold voltage;

regulating the supply voltage to a second regulated voltage when the supply voltage is less than the first predetermined threshold voltage, wherein regulating the supply voltage to the second regulated voltage comprises regulating the supply voltage to the second regulated voltage when the supply voltage is less than or equal to a second predetermined threshold voltage that is less than the first predetermined threshold voltage; and generating an unregulated voltage substantially equal to the difference between the supply voltage and a predetermined voltage when the supply voltage is between the first and second predetermined threshold voltages.

26. A method, comprising:

regulating a supply voltage to a first regulated voltage when the supply voltage is greater than or equal to a first predetermined threshold voltage;

regulating the supply voltage to a second regulated voltage when the supply voltage is less than the first predetermined threshold voltage, wherein regulating the supply voltage to the second regulated voltage comprises regulating the supply voltage to the second regulated voltage when the supply voltage is less than or equal to a second predetermined threshold voltage that is less than the first predetermined threshold voltage; and generating an unregulated voltage substantially equal to the difference between the supply voltage and a voltage drop across semiconductor device when the supply voltage is between the first and second predetermined threshold voltages.

27. A voltage regulator, comprising:

an output node;

a first regulator circuit operable to generate with a low-impedance driver a first regulated voltage on the output node when a supply voltage has a first value; and a second regulator circuit operable to generate with a high-impedance driver a second regulated voltage on the output node when the supply voltage has a second value different from the first value.

* * * * *